R. M. MOWRY.
LENGTH INDICATOR FOR BALING MACHINES AND THE LIKE.
APPLICATION FILED APR. 16, 1919.
1,342,391.                                           Patented June 1, 1920.
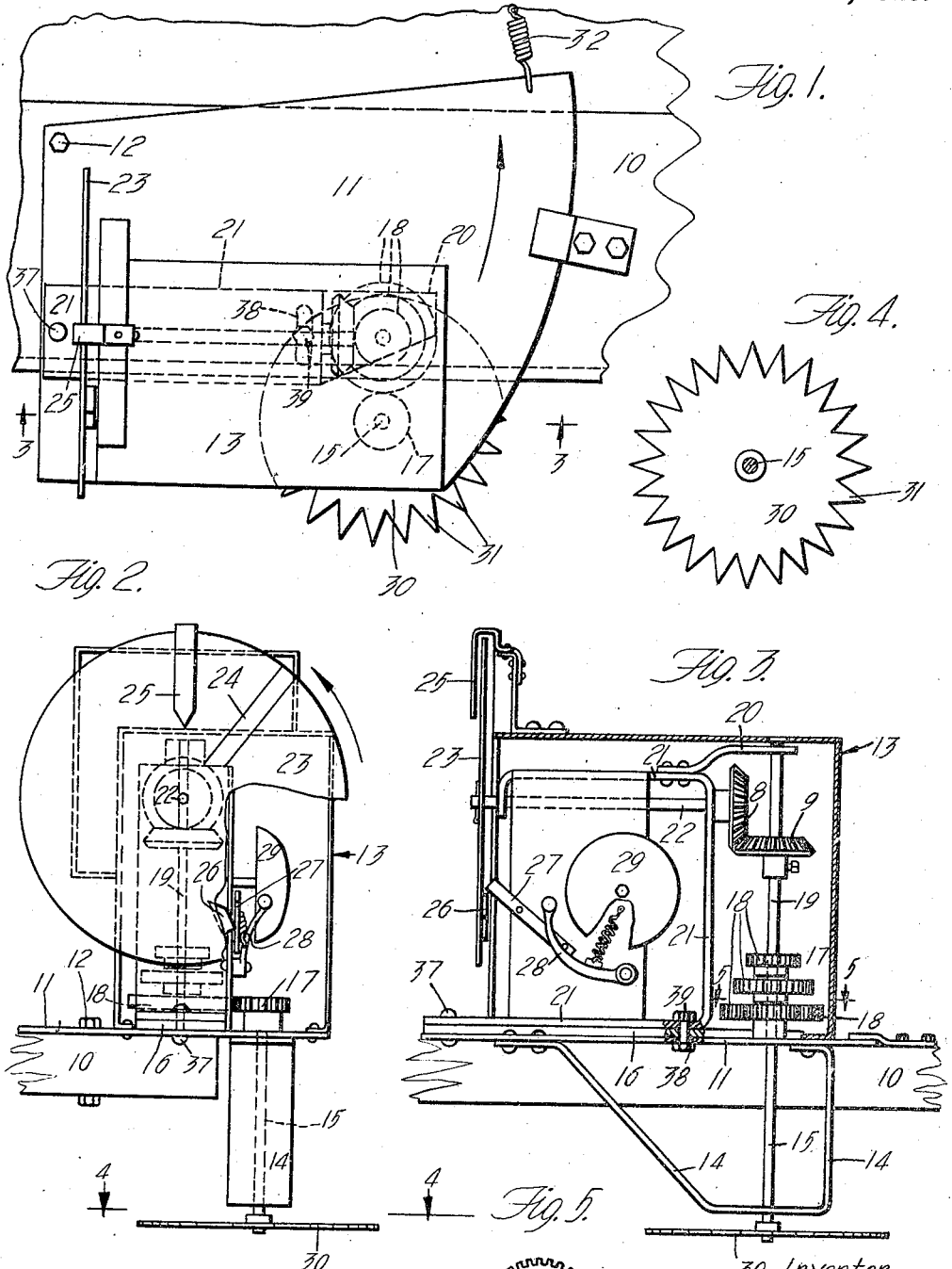
Inventor
Roy M. Mowry
by James T. Barbelew
his Attorney.

UNITED STATES PATENT OFFICE.

ROY M. MOWRY, OF LOS ANGELES, CALIFORNIA.

LENGTH-INDICATOR FOR BALING-MACHINES AND THE LIKE.

1,342,391.  Specification of Letters Patent.  Patented June 1, 1920.

Application filed April 16, 1919. Serial No. 290,368.

*To all whom it may concern:*

Be it known that I, ROY M. MOWRY, a citizen of the United States, residing at Los Angeles, in the county of Los Angeles, State of California, have invented new and useful Improvements in Length-Indicators for Baling-Machines and the like, of which the following is a specification.

This invention relates to length indicators or alarm devices for indicating or giving a signal when, for instance, a bale in a baling machine has reached a certain pre-determined length; and an object of the invention is to provide a mechanism simple and effective in its nature and one which may be easily applied to all kinds of baling machines or any machine of similar character.

Although it will be understood that my invention is not limited to the specific and particular situation and kind of work herein described nor limited to the specific arrangement and detail functions of mechanism herein stated, yet for the purpose of best describing my invention I shall describe in detail a particular form of device embodying the invention, and for this purpose I refer to the accompanying drawing in which—

Figure 1 is a plan showing my device as it appears attached to the baling chamber of a baling machine; Fig. 2 is a side elevation of the same with parts broken away for clearness of illustration; Fig. 3 is a longitudinal vertical section taken as indicated by line 3—3 on Fig. 1; Fig. 4 is a plan view of the bale engaging wheel or tracker taken as indicated by line 4—4 on Fig. 2; and Fig. 5 is a detail section taken on line 5—5 of Fig. 3.

In the drawings the numeral 10 may designate the frame of a baling chamber and 11 designates a base plate of my device pivoted at 12 to frame 10. A suitable case 13 is mounted on base plate 11 and this case contains the operating mechanism of the indicator. On the under side of plate 11 I mount a bracket 14 preferably made of bent bar iron and vertical shaft 15 is mounted in this bracket and in the plate 11. On the upper end of shaft 15 there is a pinion 17 and this pinion 17 meshes with a gear 18 on vertical shaft 19 which is mounted at its lower end in the plate 16 and at its upper end in a bracket 20 secured upon the bent iron frame 21 mounted on plate 16. A horizontal indicator shaft 22 is mounted in frame 21 and extends outside the case and there carries an indicator disk 23. This indicator disk may be painted with an indicator stripe or mark 24 thereon, and a pointer 25 is mounted on case 13 and hangs over the edge of the indicator disk. The indicator disk carries a lug 26 on its rear face adapted to strike arm 27 which arm operates clapper 28 of bell 29; the bell being operated preferably just before the indicator stripe 24 comes into register with pointer 25, calling the operator's attention to the fact that the indicator disk is about to complete a revolution.

The lower end of shaft 15 carries a bale engaging member or tracker 30 provided with sharp star like points 31 adapted to engage a bale and to accurately track its length. A spring at 32 moves plate 11 about its pivot and thereby moves and keeps the tracker wheel against the bale. It will be seen without further description that rotation of the tracker wheel causes revolution of the indicator disk and causes operation of the bell signal once for each complete revolution of the indicator disk. The length of the bale corresponding to a complete revolution of the indicator disk is determined by the ratio of gears 17 and 18. These gears are changeable. Gear 18 may be removed by merely lifting the shaft 19 which may be done by loosening the beveled gear 9 which drives gear 8 on shaft 22. The driving connection between gear 18 and shaft 19 may be of any suitable character; for instance, as shown in Fig. 5, I may use a transverse pin 35 through shaft 19 and the gear 18 will have slots 36 through it to engage the pin. Gears 18 of different sizes may be substituted one for another and if a number of such gears are used from time to time they may be carried loosely on shaft 19 as is shown in the drawings. Now in order to throw and keep gears of different diameters in mesh with pinion 17 the plate 16 and the frame 21 are pivoted at 37 to the plate 11 and a slot and bolt connection shown at 38 and 39 provides means for setting plate 16 and frame 21, and the mechanism carried there, in proper position to make the gears properly mesh.

By changing gears 18 the device is made to indicate different lengths or bales. When the operator hears the bell signal and observes the indicator disk about making a complete revolution he then knows that the bale is approaching the right length and then at just the proper time he will perform any such operation as is desired to perform upon the bale when it reaches this proper length—for instance, the operation of tying the bale, or of dropping the bale division block into place, etc.

Having described a preferred form of my invention, I claim:

1. An indicator mechanism of the character described, embodying a frame adapted to be movably mounted on a baling chamber or the like, a tracker wheel carried thereby, an indicator mounted on the movable frame, connection means whereby the tracker wheel drives the indicator; and means moving the frame and the mechanism mounted thereon as a unit to move and hold the tracker wheel in engagement with a bale in the baling chamber.

2. An indicator mechanism of the character described, embodying a frame adapted to be movably mounted on a baling chamber or the like, a tracker wheel carried thereby, an indicator mounted on the movable frame, connection means whereby the tracker wheel drives the indicator, said means including changeable gears to change the driving ratio between the tracker wheel and the indicator, and means moving the frame and the mechanism mounted thereon as a unit to move and hold the tracker wheel in engagement with a bale in the baling chamber.

3. An indicator mechanism of the character described, embodying a frame adapted to be movably mounted on a baling chamber or the like, a tracker wheel carried thereby, an indicator mounted on the movable frame, connection means whereby the tracker wheel drives the indicator, audible signal means mounted on the frame and actuated by the movement of said indicator, and means moving the frame and the mechanism mounted thereon as a unit to move and hold the tracker wheel in engagement with a bale in the baling chamber.

4. An indicator mechanism of the character described, embodying a frame adapted to be movably mounted on a baling chamber or the like, a tracker wheel carried thereby, an indicator mounted on the frame, connection means whereby the tracker wheel drives the indicator, a pointer for the indicator, the indicator having a mark thereon to register with the pointer, audible signal means mounted on the frame and actuated by the indicator just before its mark reaches registration with the pointer, and means moving the frame and the mechanism mounted thereon as a unit to move and hold the tracker wheel in engagement with a bale in the baling chamber.

5. An indicator mechanism of the character described, embodying a frame adapted to be movably mounted on a baling chamber or the like, a tracker wheel carried thereby, an indicator mounted on the frame, connection means whereby the tracker wheel drives the indicator, said means including changeable gears to change the driving ratio between the tracker wheel and the indicator, a stationary pointer for the indicator, the indicator having a mark thereon to register with the pointer, audible signal means mounted on the frame and actuated by the indicator just before its mark reaches registration with the pointer, and means moving the frame and the mechanism mounted thereon as a unit to move and hold the tracker wheel in engagement with a bale in the baling chamber.

6. An indicator mechanism of the character described, embodying a base plate adapted to be movably mounted on a baling chamber or the like, a shaft carried by the plate, a bale tracker wheel on said shaft, means tending to move the plate and keep the tracker wheel in contact with a bale in the baling chamber, a frame pivotally adjustably mounted on and carried by the plate, a shaft carried in said adjustable frame, a gear removably mounted on said shaft, a gear on the tracker shaft meshing with said removable gear, and indicator means driven by said last mentioned shaft.

7. An indicator mechanism of the character described, embodying a base plate adapted to be movably mounted on a baling chamber or the like, a shaft carried by the plate, a bale tracker wheel on said shaft, means tending to move the plate and keep the tracker wheel in contact with a bale in the baling chamber, a frame pivotally adjustably mounted on and carried by the plate, a shaft carried in said adjustable frame, a gear removably mounted on said shaft, a gear on the tracker shaft meshing with said removable gear, an indicator shaft mounted in said frame and gear-driven from said last mentioned shaft, and an indicator disk on the indicator shaft.

8. An indicator mechanism of the character described, embodying a base plate adapted to be movably mounted on a baling chamber or the like, a shaft carried by the plate, a bale tracker wheel on said shaft, means tending to move the plate and keep the tracker wheel in contact with a bale in the baling chamber, a frame pivotally adjustably mounted on and carried by the plate, a shaft carried in said adjustable frame, a gear removably mounted on said shaft, a gear on the tracker shaft meshing with said removable gear, an indicator shaft mounted in said frame and gear-driven from said last mentioned shaft, an indicator disk on the indicator shaft, a stationary pointer for the indicator, the indicator disk having a mark adapted to register with the pointer, and an audible signal mounted on said frame and adapted to be actuated by the disk just before registration of its mark with the pointer.

In witness that I claim the foregoing I have hereunto subscribed my name this 20th day of March, 1919.

ROY M. MOWRY.

Witness:
VIRGINIA I. BERINGER.